United States Patent [19]

Cucheran

[11] Patent Number: 5,190,198
[45] Date of Patent: Mar. 2, 1993

[54] VEHICLE ARTICLE CARRIER

[75] Inventor: John S. Cucheran, Lake Orion, Mich.

[73] Assignee: John A. Bott, Grosse Pointe Shores, Mich.

[21] Appl. No.: 676,085

[22] Filed: Mar. 27, 1991

[51] Int. Cl.$^5$ .............................................. B60R 9/00
[52] U.S. Cl. .................................. 224/321; 224/326; 224/309
[58] Field of Search ............... 224/321, 325, 326, 329, 224/330, 331, 309, 322; 410/104, 105, 130, 132, 139, 143, 150

[56] References Cited

U.S. PATENT DOCUMENTS

| | | |
|---|---|---|
| D. 314,541 | 2/1991 | Bott . |
| D. 317,744 | 6/1991 | Bott . |
| 2,663,472 | 12/1953 | Belgau . |
| 2,688,504 | 9/1954 | Parker . |
| 3,165,353 | 1/1965 | Weise . |
| 3,212,457 | 10/1965 | Looker . |
| 3,241,501 | 3/1966 | Watts . |
| 3,399,635 | 9/1968 | Heard . |
| 3,776,437 | 12/1973 | Carney . |
| 4,020,769 | 5/1977 | Keir . |
| 4,085,684 | 4/1978 | McLennan et al. . |
| 4,099,658 | 7/1978 | Bott . |
| 4,101,061 | 7/1978 | Sage et al. ............................ 224/322 |
| 4,133,465 | 1/1979 | Bott . |
| 4,162,755 | 7/1979 | Bott . |
| 4,182,471 | 1/1980 | Bott . |
| 4,256,424 | 3/1981 | Knox et al. . |
| 4,274,570 | 6/1981 | Bott . |
| 4,294,388 | 10/1981 | Wunstel ............................ 224/322 |
| 4,295,587 | 10/1981 | Bott . |
| 4,323,182 | 4/1982 | Bott . |
| 4,364,500 | 12/1982 | Bott . |
| 4,396,175 | 8/1983 | Long et al. . |
| 4,431,123 | 2/1984 | Bott . |
| 4,473,178 | 9/1984 | Bott . |
| 4,493,470 | 1/1985 | Engel . |
| 4,496,271 | 1/1985 | Spinosa et al. . |
| 4,509,888 | 4/1985 | Sheek . |
| 4,516,710 | 5/1985 | Bott . |
| 4,684,048 | 8/1987 | Bott ............................ 224/326 |
| 4,688,843 | 8/1987 | Hall . |
| 4,708,549 | 11/1987 | Jensen . |
| 4,754,905 | 7/1988 | Bott . |
| 4,771,969 | 9/1988 | Dowd . |
| 4,877,168 | 10/1989 | Bott . |
| 4,899,917 | 2/1990 | Bott . |
| 4,967,945 | 11/1990 | Bott . |
| 4,972,983 | 11/1990 | Bott . |
| 4,982,886 | 1/1991 | Cucheran . |
| 5,082,158 | 1/1992 | Bott . |

OTHER PUBLICATIONS

Ser. No. 07/506,628, filed Apr. 9, 1990; Ser. No. 07/604,111, filed Oct. 26, 1990; Ser. No. 07/592,606, filed Oct. 4, 1990; Ser. No. 07/609,825, filed Nov. 6, 1990; Ser. No. 07/609,824, filed Nov. 6, 1990; Ser. No. 07/550,107, filed Jul. 6, 1990, which is a continuation of U.S. Pat. No. 4,972,983, Nov. 27, 1990; Ser. No. 07/591,722, filed Oct. 2, 1990, which is a continuation of U.S. Pat. No. 4,972,983, issued Nov. 27, 1990.

Primary Examiner—Linda J. Sholl
Attorney, Agent, or Firm—Harness, Dickey & Pierce

[57] ABSTRACT

The present invention is an article carrier for a vehicle including a plurality of slats fixedly secured on a generally horizontal extending exterior vehicle body surface. The plurality of slats extend generally longitudinally of the vehicle. A pair of brackets are disposed upon selected slats and a crossbar extends laterally between and secured adjacent its opposite ends to the pair of brackets. The slats include a channel member for permitting sliding movement of at least one of the brackets along the length thereof. A locking structure on the brackets cooperates with the channel member of each of the selected slats for simultaneously engaging and disengaging the channel members for detachably securing and allowing longitudinal adjustment of the crossbar and brackets at predetermined positions along the slats.

11 Claims, 4 Drawing Sheets

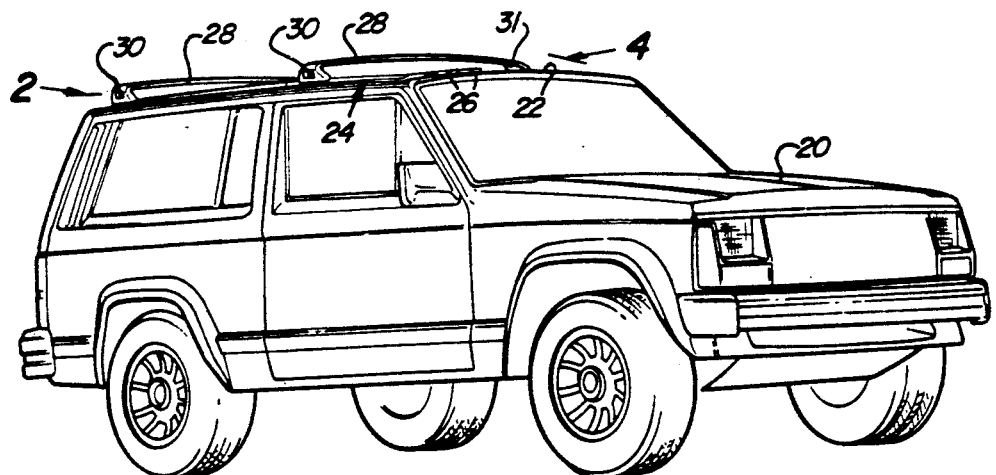
Fig-1
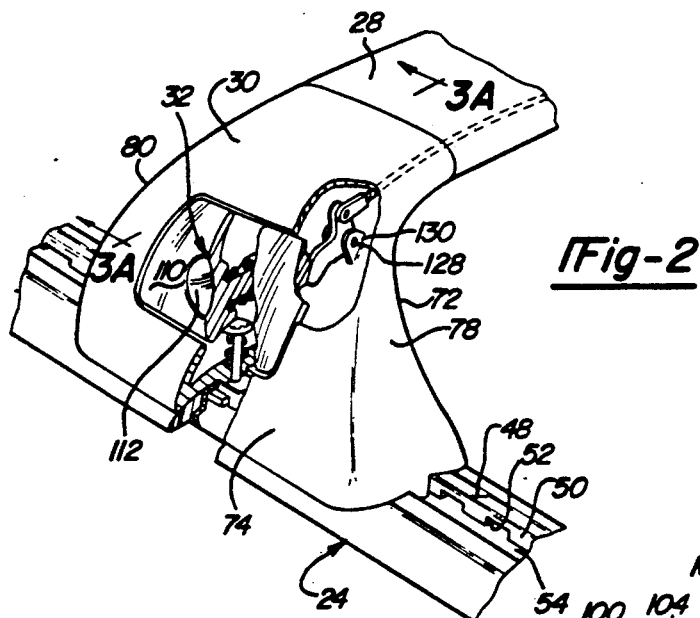
Fig-2
Fig-3A

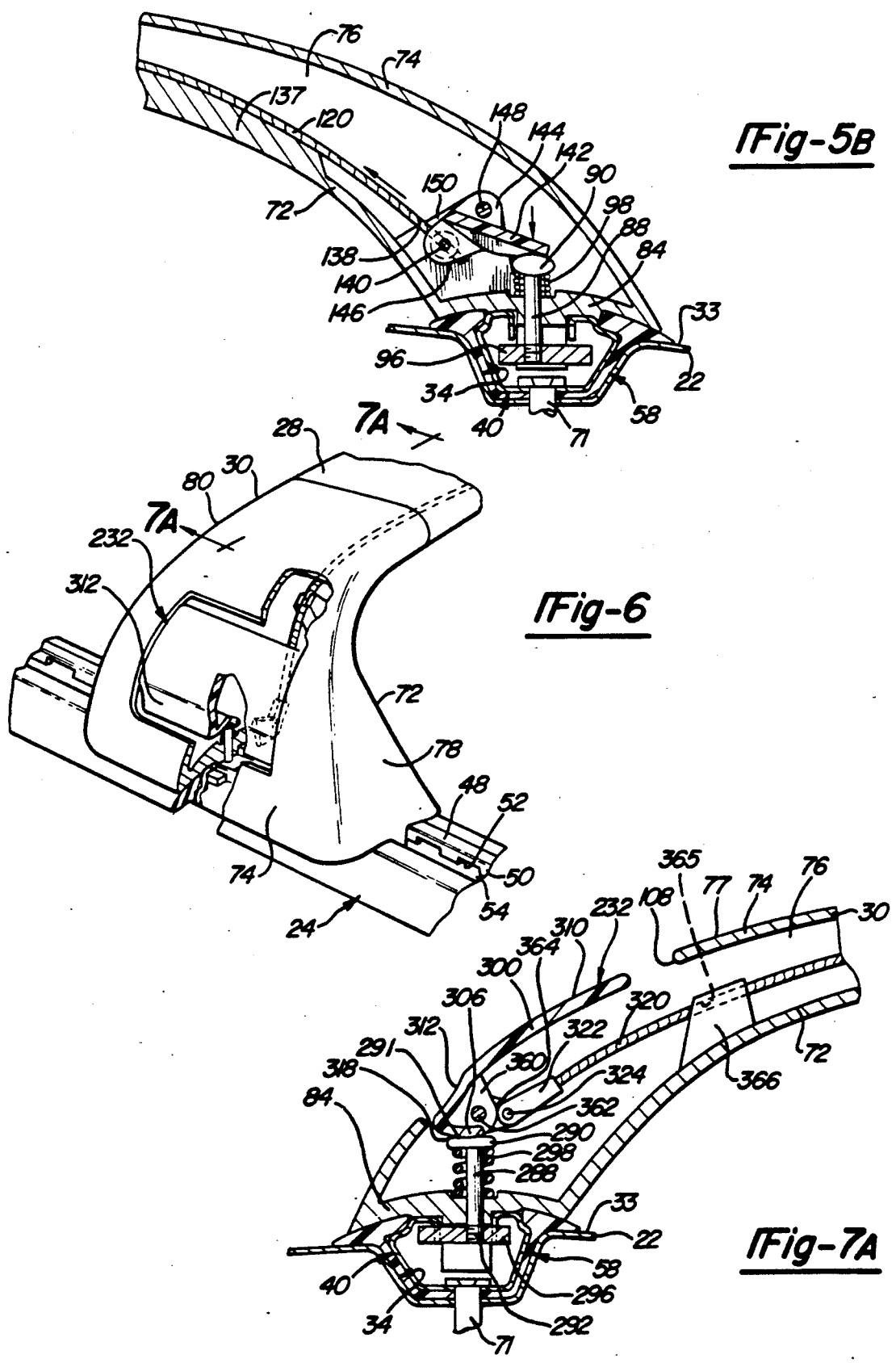

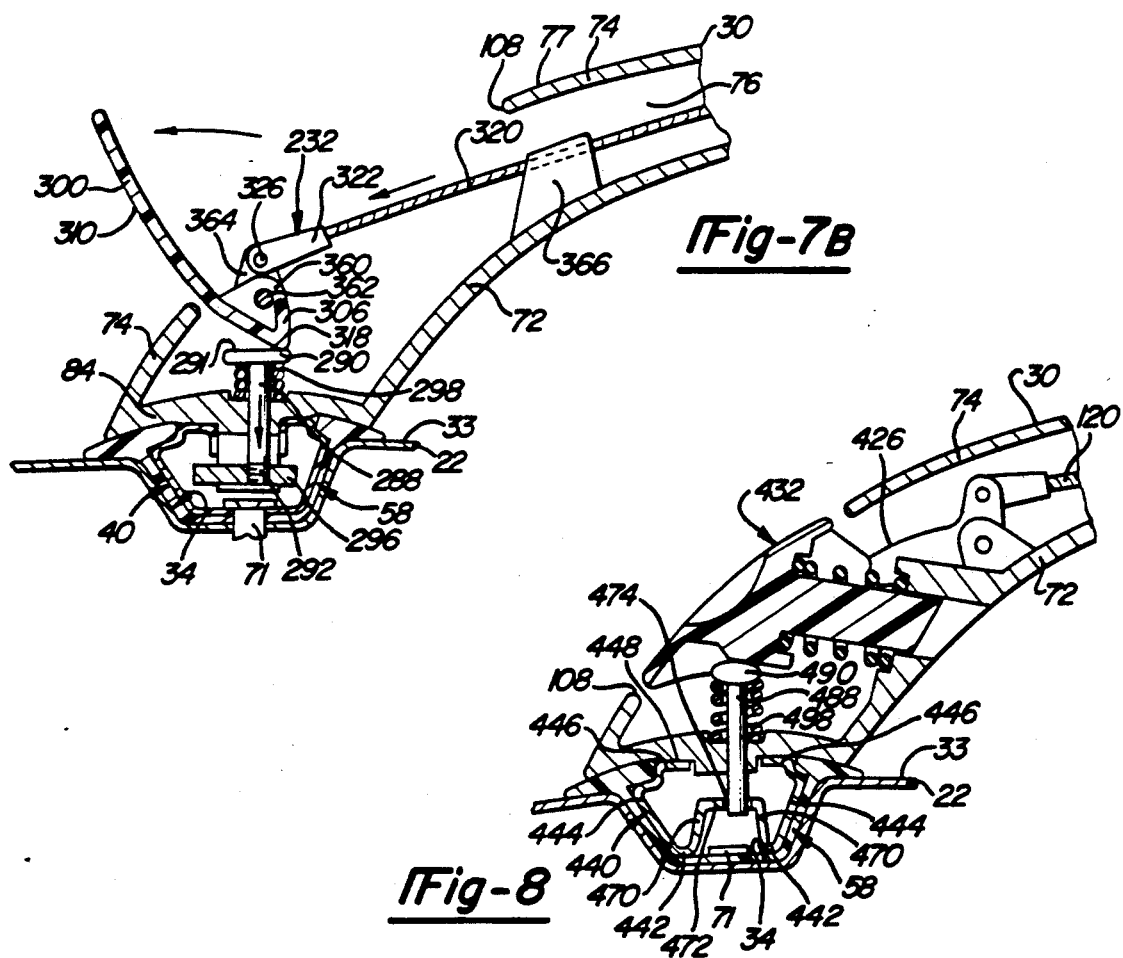
*Fig-7B*
*Fig-8*
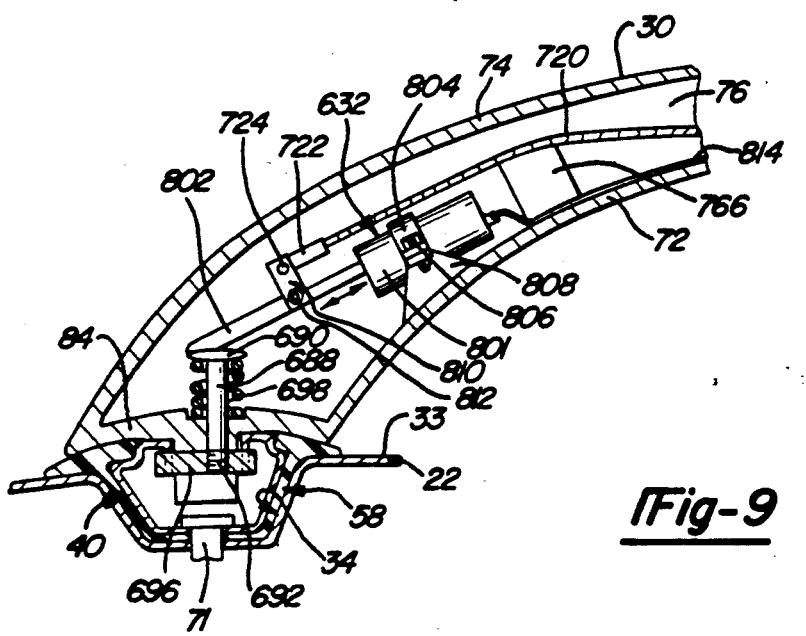
*Fig-9*

VEHICLE ARTICLE CARRIER

BACKGROUND OF THE INVENTION

1. Field of the Invention

The present invention relates generally to article carriers for vehicles, and more particularly, to an adjustable crossbar for an article carrier on an automotive vehicle.

2. Description of the Related Art

Vehicle article carriers frequently employ two separate subassemblies or portions: a rectangular framework which surrounds the load to be carried and a plurality of slats which rest on the roof or other vehicle body portion and carries the weight of the load. In such constructions, the framework and the slats are often secured to the vehicle body independently of one another. In still another vehicle article or luggage carrier, a crossbar replaces the framework as a means for confining articles upon the slats.

In prior U.S. Pat. No. 4,182,471, an article carrier for an automotive vehicle was disclosed having crossbars which are easily removed, interchanged or adjusted in position on the slats in accordance with the needs of the user. This construction has achieved significant commercial success. Nevertheless, a need exists to provide a crossbar having a locking structure adapted to engage and disengage the slats by actuation of an operator on only one side of the vehicle to allow adjustment of the crossbar at various locations along the slats. It is also believed that a need exists for an article carrier which has an attractive appearance of modern article carriers but which possesses a greater degree of adjustability and ease of operation. It is further believed that a need exists for a crossbar having a locking structure which can be power operated to allow adjustment of the crossbar by an operator on only one side of the vehicle at various locations along the slats.

SUMMARY OF THE INVENTION

The present invention is an article carrier for a vehicle including a plurality of slats fixedly secured on a generally horizontal extending exterior vehicle body surface. The plurality of slats extend generally longitudinally of the vehicle. A pair of brackets are disposed upon selected slats and a crossbar extends laterally between and secured adjacent its opposite ends to the pair of brackets. The selected slats include means defining a channel member for permitting sliding movement of at least one of the brackets along the length thereof. A means on the brackets cooperates with the channel member of each of the selected slats for simultaneously engaging and disengaging said channel members for detachably securing and allowing longitudinal adjustment of the crossbar and brackets at predetermined positions along the slats.

One advantage of the present invention is that an article carrier is provided which has an attractive appearance and greater degree of adjustability and ease of operation. Another advantage of the present invention is that a locking structure for a crossbar is provided which allows the crossbar to be adjusted by an operator on only one side of the vehicle at various positions along the length of the slats. A further advantage of the present invention is that the locking structure may be power operated to engage and disengage the slats. A still further advantage of the present invention is that the locking structure may include a cable member which moves an actuating member generally vertically relative to the slats upon actuation by an operator on one side of the vehicle to allow adjustment of the crossbar along the length of the slats.

Other objects, features and advantages of the present invention will be readily appreciated as the same becomes better understood when viewed in light of the following description and accompanying drawings.

BRIEF DESCRIPTION OF THE DRAWINGS

FIG. 1 is a perspective view of a vehicle illustrating an article carrier mounted thereon which is constructed in accordance with the principles of the present invention.

FIG. 2 is an enlarged partial perspective view with a portion broken-away of the structure looking in the direction of arrow 2 of FIG. 1.

FIG. 3A is a sectional view taken along line 3A—3A of FIG. 2 illustrating a locking structure in an engaged position.

FIG. 5B is a view of the structure similarly illustrated in FIG. 5A illustrating the locking structure in a disengaged position.

FIG. 6 is an enlarged partial perspective view with a portion broken-away of a first alternate embodiment of the article carrier of FIG. 1.

FIG. 7A is a sectional view taken along line 7A—7A of FIG. 6 illustrating a locking structure in an engaged position.

FIG. 7B is a view of the structure similarly illustrated in FIG. 7A illustrating the locking structure in a disengaged position.

FIG. 8 is a sectional view of a second alternate embodiment of the article carrier of FIG. 1.

FIG. 9 is a sectional view of a third alternate embodiment of the article carrier of FIG. 1.

DESCRIPTION OF THE PREFERRED EMBODIMENT(S)

Figure 3B:
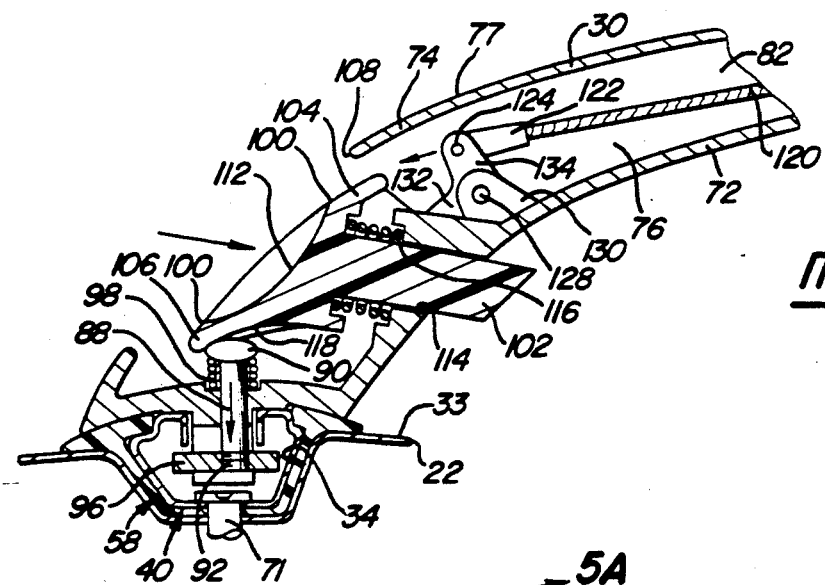
FIG. 3B is a view of the structure similarly illustrated in FIG. 3A illustrating the locking structure in a disengaged position.

FIG. 1 depicts a vehicle 20 such as an automobile having a generally horizontal exterior roof 22 on which is mounted an article carrier including a pair of identical, parallel, transversely spaced slat assemblies, slats or side rails, generally indicated at 24. Mounted on the roof 22 are a plurality of identical, parallel, transversely spaced support slats 26 of the article carrier. The support slats 26 are disposed between the side rails 24 such that the support slats 26 are transversely spaced between the side rails 24. Although the support slats 26 and side rails 24 are shown mounted on the roof 22, the article carrier of the present invention may be mounted with equal utility on a trunk lid or any other generally horizontal exterior body portion of the vehicle 20.

Mounted on the side rails 24 is at least one, preferably a pair of raised tubular restraining bars or crossbars 28 of the article carrier. The crossbars 28 are fitted at their opposite ends onto stanchions, bracket members or brackets 30 and 31. The article carrier includes a securing and adjusting mechanism or locking structure, generally indicated at 32, for locking and unlocking the crossbar 28 in position along the side rail 24. The locking structure 32 allows the crossbar 28 to be positioned operably at predetermined locations defined by a plurality of notches 46, to be described, along the length of the side rail 24. The locking structure 32 is adapted to allow a person to adjust the crossbar 28 along the side rails 24 on, preferably only, one side of the vehicle 20.

As illustrated in FIGS. 2 and 3a, the roof 22 has a vehicle body surface 33 including a plurality of transversely spaced and downwardly directed recesses, generally indicated at 34. Preferably, the vehicle body surface 33 has a pair of recesses 34 with each recess 34 being disposed near the outermost side of the roof 22. Each recess 34 extends generally longitudinally along the vehicle body surface 33 and is defined by a bottom surface 36 being generally horizontal and a pair of side surfaces 38 and end surfaces (not shown) extending upwardly from edges of the bottom surface 36 at an angle or incline to the vehicle body surface 33. It should be appreciated that the surfaces 36 and 38 are integral and may form a weld ditch of the roof 22.

The side rail 24 includes a channel member, generally indicated at 40, which extends generally longitudinally and is adapted to be received in each recess 34. The channel member 40 includes a generally horizontally bottom wall 42 and a pair of generally inclined upwardly and outwardly extending side walls 44. The bottom wall 42 has a transverse width less than a transverse width of the bottom surface 36 of the recess 34 to form a transverse space between the side walls 44 of the channel member 40 and side surfaces 38 of the recess 34. The channel member 40 also includes generally horizontal side ledges 46 extending inwardly at the upper ends of the side walls 44. The side ledges 46 include an upper article supporting surface 48. The channel member 40 further includes a flange 50 extending generally vertically downwardly from a free end of each side ledge 46. The flange 50 includes a plurality of longitudinally spaced notches 52. Preferably, the notches 52 are generally rectangular in shape. The bottom wall 42 and side walls 44 and ledges 46 form an upwardly opening channel 54 which is wider at its bottom than at the top. It should be appreciated that the bottom wall 42, side walls 44, ledges 46, and flanges 50 are integral and extend longitudinally. It should also be appreciated that an outer supporting surface 48 is slightly below an inner supporting surface 48. It should further be appreciated that the outer and inner article supporting surfaces 48 may extend generally in the same plane.

The side rail 24 may include a sealing strip, generally indicated at 58, interposed between the recess 34 and the channel member 40. The sealing strip 58 has a bottom portion 59 which is generally planar and extends longitudinally. The bottom portion 59 is disposed between the bottom surface 36 of the recess 34 and the bottom wall 42 of the channel member 40. The thickness or height of the bottom portion 59 may be varied such that the upper article supporting surface 48 is substantially flush or, preferably, disposed above the vehicle body surface 33.

The sealing strip 58 also includes side portions 60 extending longitudinally and upwardly from the bottom portion 59 between the side surfaces 38 of the recess 34 and side walls 44 of the channel member 40. The sealing strip 58 has a top portion 62 at each upper end of the side portions 60 to close or seal the longitudinal space between the channel member 40 and recess 34. The top portions 62 have a top surface 64, an outer surface 66 and an inner surface 68. The top surface 64 is generally arcuate in shape. The outer surface 66 is adapted to overlap the vehicle body surface 33 and the inner surface 68 is adapted to engage a recess 70 in the side walls 44 of the channel member 40. The channel member 40 and sealing strip 58 are secured in the recess by suitable means such as a plurality of fasteners 71. The fasteners 71 may be screws or the like and are spaced longitudinally along the bottom wall 42 of the channel member 40. The sealing strip 58 is, preferably, made of an elastomeric material. The sealing strip 58 is adapted to prevent foreign matter such as dirt, water or the like from entering the recess 34. The sealing strip 58 also provides an aesthetic appearance.

Referring to FIGS. 2 and 3A, the bracket 30 has a generally arcuate shape and includes inner and outer side walls 72 and 74 which are transversely spaced to form a hollow interior chamber 76. The outer side wall 74 has an outer surface 77. The inner and outer side walls 72 and 74 are connected together by end walls 78 and 80 to form a housing about the interior chamber 76. The walls 72, 74, 78 and 80 define an opening 82 at an upper end of the interior chamber 76. It should be appreciated that the opening 82 is adapted to receive one end of the crossbar 28. It should also be appreciated that the crossbar 28 is secured to the bracket 30 by suitable means such as, for example, fasteners (not shown).

The bracket 30 also has a longitudinally and transversely extending lower wall 84 at a lower end thereof. The lower wall 84 closes the lower end of the interior chamber 76. The lower wall 84 is generally arcuate in cross-section and matingly engages the top surface 64 of the top portion 62 of the sealing strip 58. The lower wall 84 may include at least one, preferably a pair of longitudinally spaced and generally downwardly extending projections or feet 86 which slide along the channel 54.

The locking structure 32 includes a locking member 88 having an outwardly extending head 90 at an upper end and a threaded portion 92 at a lower end thereof. The head 90 has a generally oval shape while the remainder of the locking member 88 has a generally cylindrical shape. The locking member 88 is generally vertically orientated and disposed within the interior chamber 76. The locking member 88 extends downwardly through an aperture or opening 94 of the lower wall 84 and into the channel 54. The locking structure 32 also includes a plate member 96 connected to or threaded about the lower end 86 of the locking member 88. The plate member 96 is generally rectangular in shape and has a transverse width greater than the top of the channel 54. The plate member 96 has a longitudinal length less than the length of the notches 52 such that the plate member 96 can engage and disengage the notches 52. The locking structure 32 also includes a spring member 98 disposed about the locking member 88 and abuts the head 90 and the lower wall 84. The spring member 98 is made of a spring metal material and is adapted to urge or move the locking member 88 upward such that the plate member 96 is disposed within and engages the notches 52.

The locking structure 32 further includes an actuating member 100 for actuating or moving the locking member 88 such that the plate member 96 is moved downwardly and upwardly to disengage and engage the notches 52, respectively. The actuating member 100 is formed as a wall having a guide portion 102 extending inwardly into the interior chamber 76 and upper and lower flange portions 104 and 106 at each end. The actuating member 100 is generally rectangular in shape and is disposed in a generally rectangular aperture 108 of the bracket 30. The actuating member 100 has an outer surface 110 which is generally arcuate and contoured to match the outer surface 77 of the bracket 30. The outer surface 110 is adapted to be substantially flush with the outer surface 77 of the bracket 30 when the actuating member 100 is in the engaged or closed position shown in FIG. 3A. The actuating member 100 further includes a recess 112 to allow a person to dispose their finger or thumb to move the actuating member 100 between the engaged and disengaged positions of FIGS. 3A and 3B, respectively.

The guide portion 102 of the actuating member 100 is generally cylindrical in shape and disposed within a generally cylindrical passageway 114 extending through the inner side wall 72. The guide portion 102 is adapted to slide along the passageway 114. The actuating member 100 includes a spring member 116 disposed about the guide portion 102 and is adapted to urge or move the actuating member 100 toward the outer wall 72. The lower flange portion 106 has a lower surface 118 which is arcuate in shape and is adapted to receive and matingly engage the head 90 of the locking member 88. The lower surface 118 acts as a camming surface to move the locking member 88 downwardly and upwardly as the actuating member 100 is moved inwardly and outwardly relative to the interior chamber 76. It should be appreciated that the actuating member 100 may have side flange portions disposed within the interior chamber 76 to prevent the actuating member 100 from exiting the aperture 108.

Figure 4:
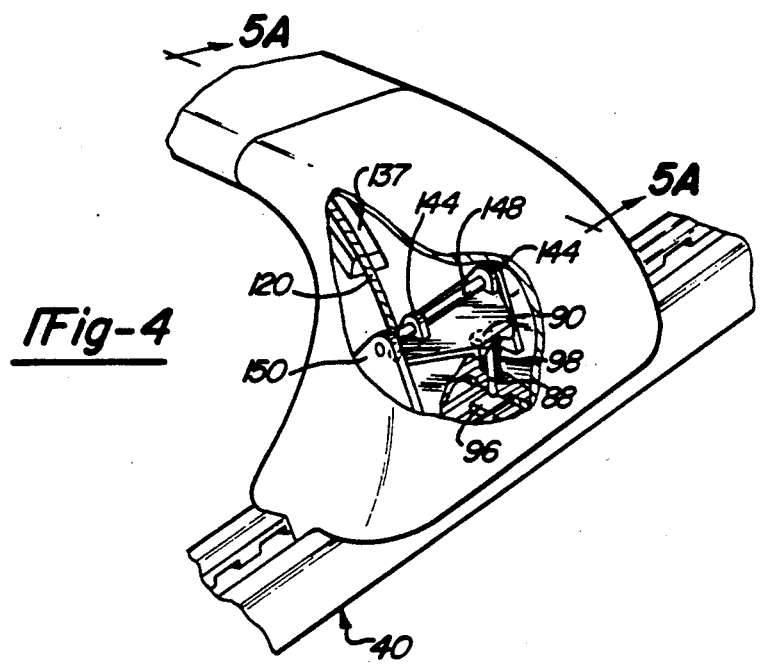
FIG. 4 is an enlarged partial perspective view with a portion broken-away of the structure looking in the direction of arrow 4 of FIG. 1.
Figure 5A:
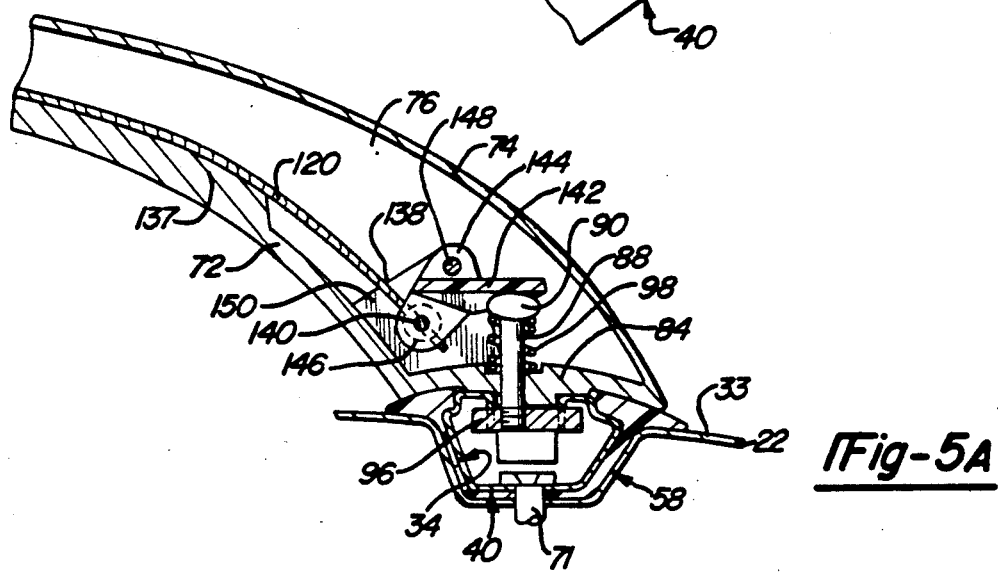
FIG. 5A is a sectional view taken along line 5A—5A of FIG. 4 illustrating a locking structure in an engaged position.

As illustrated in FIGS. 3, 4 and 5A, the locking structure 32 includes a cable 120 extending through the brackets 30 and 31 and crossbar 28. The cable 120 has a first end 122 pivotally connected by a pin member 124 to an L-shaped lever member 126. The lever member 126 is pivotally connected by a shaft 128 between a pair of spaced flanges 130 extending from the inner side wall 72 into the interior chamber 76. The lever member 126 has a leg portion 132 and a foot portion 134. The foot portion 134 is pivotally connected to the first end 122 of the cable 120 and is generally vertically oriented within the interior chamber 76. The leg portion 132 is generally horizontally oriented within the interior chamber 76 and is adapted to engage a protrusion 136 of the actuating member 100. The protrusion 136 extends inwardly into the interior chamber 76 and is adapted to pivotally move the leg portion 132 downwardly upon movement of the actuating member 100 inwardly into the interior chamber 76.

Referring to FIGS. 4 and 5A, the bracket 31 has a shape and locking structure 32 similar to bracket 30. Like parts of bracket 30 have like numbers for bracket 31. The bracket 31 eliminates the aperture 108 and actuating member 100. It should be appreciated that the locking member 88 and plate member 96 operate similar to that of bracket 30.

The cable 120 extends through the crossbar 28 and into the bracket 31. The cable 120 has a second end 138 pivotally connected by a pin member 140 to a lever member 142. The lever member 142 is generally planar and disposed and generally horizontally oriented within the interior chamber 76 of the bracket 31. The lever member 142 has an upper flange 144 and a lower flange 146. The lower flange 146 is attached to the pin member 140. The upper flange 144 is pivotally connected by a shaft 148 between a pair of spaced side flanges 150 extending from the inner side wall 72 and lower wall 84 into the interior chamber 76. It should be appreciated that the locking member 88 moves downwardly and upwardly as the lever member 142 is rotated.

IN OPERATION

As illustrated in FIGS. 3A and 5A, the plate member 96 of the locking structure 32 engages a pair of opposed notches 52 of the channel member 40 for each side rail 24 to secure the brackets 30 and 31 to the side rails 24 when the actuating member 100 is in the engaged or closed position. An operator manually pushes or moves the actuating member 100 inwardly into the interior chamber 76. When this occurs, the lower surface 118 cams against the head 90 to move the locking member 88 of the bracket 30 downwardly. The downward movement, in turn, causes the plate member 96 to move downwardly and disengage the notches 52. Simultaneously, the protrusion 136 engages the leg portion 132 of the lever member 126 and rotates the leg portion 132 downwardly, in turn, rotating the foot portion 134 toward the outer side wall 74 of the bracket 30. The rotational movement pulls on the cable 120 to rotate the lower flange 146 of the lever member 142 upwardly. This upward movement of the lower flange 146 rotates the lever member 142 downwardly, in turn, moving the head 90 and locking member 88 of the bracket 31 downwardly. The downward movement, in turn, causes the plate member 96 to move downwardly and disengage the notches 52. It should be appreciated that the unlocking of the brackets 30 and 31 occurs substantially simultaneously.

The operator then slides the brackets 30 and 31 and crossbar 28 along the side rails 24. When the crossbar 28 is at a desired location, the operator releases or slides the actuating member 100 outwardly toward the outer side wall 74. The spring 116 moves the actuating member 100 toward the outer side wall 74 and the lower surface 118 of the actuating member 100 allows the spring 98 to move the locking member 88 of the bracket 30 upward. The plate member 96 moves upwardly to engage the notches 52. Similarly, the leg portion 132 of the lever member 126 is rotated upwardly and the cable 120 moves toward bracket 31. As this occurs, the spring 98 moves the locking member 88 upwardly as the lever member 142 rotates. The plate member 96 moves upwardly to engage the notches 52 to lock the bracket 31 and crossbar 28 in position. The operation may be repeated.

Referring to FIGS. 6, 7A and 7B, an alternate embodiment 232 of the locking structure 32 is shown. Like parts of the locking structure 32 have like numbers increased by two hundred (200). The locking structure 232 has a locking member 288 with a head 290. The head 290 is generally circular in diameter and planar on an upper surface 291 thereof. The locking structure 232 has an actuating member 300 for actuating or moving the locking member 288 such that the plate member 296 is moved downwardly and upwardly to disengage and engage the notches 52, respectively. The actuating member 300 is formed as a wall having a lower flange 306 extending inwardly into the interior chamber 76. The actuating member 300 is generally rectangular in shape and is disposed in a generally rectangular aperture 108 of the bracket 30. The actuating member 300 has an outer surface 310 which is generally arcuate and contoured to match the outer surface 77 of the bracket 30. The outer surface 310 is adapted to be substantially flush with the outer surface 77 of the bracket 30 when the actuating member 300 is in the engaged position illustrated in FIG. 7A. The actuating member 300 further includes a longitudinal recess 312 to allow a person to dispose their finger or thumb to move the actuating member 300 between the engaged and disengaged positions of FIGS. 7A and 7B, respectively.

The actuating member 300 includes a pair of spaced side flanges 360 pivotally disposed about a shaft 362. The shaft 362 is pivotally supported by flanges (not shown) on an interior surface of the outer side wall 74. The actuating member 300 may be pivoted between a closed or engaged position and an open or disengaged position as illustrated in FIGS. 7A and 7B, respectively. The lower flange 306 has a lower surface 318 which is arcuate in shape and is adapted to matingly engage the head 290 of the locking member 288. The lower surface 318 acts as a camming surface to move the locking member 288 downwardly and upwardly. It should be appreciated that the actuating member 300 may be rotated to an over-center condition to lock the actuating member 300 in the open or disengaged position of FIG. 7B.

The locking structure 232 includes a cable 320 extending through the brackets 30 and 31 and crossbar 28. The cable 320 has a first end 322 pivotally connected by a pin member 324 to a protrusion 364 of the actuating member 300. The protrusion 364 extends from the actuating member 300 inwardly into the interior chamber 76. The cable 320 may be extended through an aperture 365 in a raised portion 366 on the inner side wall 72 such that the cable 320 does not contact the inner side wall 72. When the actuating member 300 is rotated from the closed position to the open position, the protrusion 364 is rotated upwardly to pull on the cable 320. The pulling movement of the cable 320 moves a locking member 88 and plate member 96 of bracket 31, which is similar to that of FIGS. 5A and 5B, to a disengaged or unlocked position.

Referring to FIG. 8, a second alternate embodiment 432 and 440 of the locking structure 32 and channel member 40, respectively, are shown. Like parts of locking structure 32 and channel member 40 have like numerals increased by four hundred (400). The channel member 440 eliminates the flanges 50. Instead, the channel member 440 includes inner side walls 470 extending upwardly and inwardly from the bottom wall 442 to a generally planar platform wall 472. The platform 472 wall may extend longitudinally and continuously. The platform wall 472 includes at least one, preferably a plurality of spaced apertures 474. The apertures 474 have a diameter greater than the diameter of the locking member 488. The locking structure 432 eliminates the plate member 96 and the locking member 488 engages and disengages the apertures 474 to secure the crossbar 28 in position along the slide rails 24. The operation of the locking structure 432 is similar to the locking structure 32.

Referring to FIG. 9, a third alternate embodiment 632 of the locking structure 32 is shown. Like parts have like numerals increased by six hundred (600). The locking structure 632 has an actuating member comprising a solenoid 801. The solenoid 801 has a moveable shaft 802 extending from one end thereof which engages the head 690 of the locking member 688. The solenoid 801 is mounted by brackets 804 and fasteners 806 to a pair of spaced flanged 808 of the inner side wall 72 and extending within the interior chamber 76 of the bracket 301. A cable 720 has a first end 722 connected by a pin member 724 to a bracket member 810 secured by a fastener 812 to the movable shaft 802. A raised portion 766 may extend from the inner side wall 72 to elevate the cable 720 such that it does not contact the inner side wall 72. The solenoid 801 is connected by a wire 814 to a switch (not shown) and source of electrical power (not shown) to energize and de-energize the solenoid 801 to move the shaft 802 away and toward the end of the solenoid 801. When the solenoid 701 is energized, the shaft 802 is extended to move the head 690, locking member 688 and plate member 696 downwardly to disengage the notches 52. When the solenoid 701 is de-energized, the shaft 802 is retracted to allow the spring 698 to move the head 690, locking member 688 and plate member 696 upwardly to engage the notches 52.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

I claim:

1. An article carrier for a vehicle comprising:
    a plurality of slats fixedly secured on a generally horizontally extending exterior vehicle body surface, said slats extending generally longitudinally of the vehicle;
    a pair of brackets disposed upon certain of said slats and a restraining bar extending laterally between and secured adjacent its opposite ends to said bracket; and
    selected slats of said slats including means for defining a channel member for permitting sliding movement of at least one of said brackets along the length thereof, and means for defining one or more notches located along said channel member;
    said brackets each including a locking member cooperable with said one or more notches and moveable between engaged and disengaged positions for locking and unlocking said brackets at a position along said certain of said slats;
    cable means operatively associated with at least one of said locking members for urging said one locking member into and out of said engaged and disengaged positions;
    actuating means positioned on at least one of said brackets and operatively associated with said cable means and at least one of said locking members for causing said locking members of each of said brackets to be moved generally simultaneously to releasably secure and allow longitudinal adjustment of said restraining bar and said brackets at predetermined positions along said certain of said slats; and
    said actuating means being manually movable generally linearly within a plane extending through said restrainging bar.

2. An article carrier as set forth in claim 1 including spring means for urging said locking member into said engaged position.

3. An article carrier as set forth in claim 2 including a plate member at a lower end of each said locking member for engaging and disengaging said one or more notches.

4. An article carrier as set forth in claim 3, wherein said cable means includes a cable member extending through said brackets and said cross bar; and wherein said article carrier further comprises a lever member pivotally secured to each of said brackets and also to opposite ends of said cable member.

5. An article carrier as set forth in claim 4 wherein said actuating means comprises an actuating member having a protrusion extending inwardly relative to an outer surface thereof to move at least one said lever member and said locking members between said engaged and disengaged positions.

6. An article carrier as set forth in claim 5 wherein said actuating member includes a camming surface defining said engaged and disengaged positions, said camming surface cooperating with at least one said locking member to move said at least one said locking member between said engaged and disengaged positions.

7. An article carrier for a vehicle comprising:
a plurality of slats fixedly secured on a generally horizontally extending exterior vehicle body surface, said plurality of slats extending generally longitudinally of the vehicle;
a pair of brackets disposed upon certain of said plurality of slats and a restraining bar extending laterally between and secured adjacent its opposite ends to said pair of brackets;
selected slats of said slats including means defining a channel member for permitting sliding movement of at least one of said brackets along the length thereof, and means defining one or more notches located along said channel member;
said pair of brackets each including a locking member cooperable with said one or more notches of said selected slats and being moveable between an engaged and a disengaged position for locking and unlocking and said bracket at a position along said slats and allowing longitudinal adjustment of said restraining bar and said pair of brackets at predetermined positions along said selected slats;
means for forming a cable operably associated with at least one of said locking members for controlling movement of said at least one said locking member;
spring means for urging said locking members into said engaged position;
actuating means associated with at least one of said brackets and cooperable with said locking members and said cable means to move said locking members between said engaged and disengaged positions;
said actuating means being manually movable generally linearly inwardly and outwardly relative to said at least one bracket within a plane extending through said restraining bar;
said brackets each including means forming an interior chamber having upper and lower ends, said locking members extending through said lower end;
said actuating means comprising an actuating member having an outer surface substantially flush with an outer surface of said at least one bracket and a protrusion extending inwardly into said interior chamber of said at least one bracket; and
a lever member pivotally secured to each of said pair of bracket, at least one of said lever members being cooperable with said protrusion to be pivotally moved by said protrusion as said actuating member is moved linearly; and
said cable means being attached to each of said lever members for moving one of said lever members in response to movement of said other lever member.

8. An article carrier for a vehicle comprising:
a plurality of slats fixedly secured on a generally horizontally extending exterior vehicle body surface, said plurality of slats extending generally longitudinally of the vehicle;
a pair of brackets disposed upon certain of said plurality of slats and a restraining bar extending laterally between and secured adjacent its opposite ends to said pair of brackets;
selected slats of said slats including means defining a channel member for permitting sliding movement of at least one of said brackets along the length thereof, and means defining one or more notches located along said channel member;
said pair of brackets each including a locking member cooperable with said one or more notches of said selected slats and being moveable between an engaged and a disengaged position for locking and unlocking and said bracket at a position along said slats and allowing longitudinal adjustment of said restraining bar and said pair of brackets at predetermined positions along said selected slats;
means for forming a cable operably associated with at least one of said locking members for controlling movement of said at least one locking member;
spring means for urging said locking members into said engaged position;
actuating means associated with at least one of said brackets and cooperable with said locking members and said cable means to move said locking members between said engaged and disengaged positions;
said actuating means being manually movable generally linearly inwardly and outwardly relative to said at least one bracket within a plane extending through said restraining bar and generally perpendicular to said vehicle body surface;
said brackets each including means forming an interior chamber having upper and lower ends, said locking members extending through said lower end;
said actuating means comprising an actuating member having an outer surface substantially flush with an outer surface of said at least one bracket and a protrusion extending inwardly into said interior chamber of said at least one bracket; and
a lever member pivotally secured to each of said brackets, at least one of said lever members being cooperable with said protrusion to be pivotally moved by said protrusion as said actuating member is moved linearly; and
said cable means being attached to each of said lever members for moving one of said lever members in response to movement of said other lever member, both of said lever members moving pivotally within a plane extending generally perpendicular to said vehicle body surface.

9. An article carrier for a vehicle comprising:
a plurality of salts fixedly secured on a generally horizontally extending exterior vehicle body surface, said slats extending generally longitudinally of the vehicle;
a pair of brackets disposed upon certain of said slats;

a restraining bar extending laterally between and secured adjacent its opposite ends to said pair of brackets;

certain slats of said slats including means for defining a channel member for permitting sliding movement of at least one of said pair of brackets along the length thereof, and means for defining one or more notches located along said channel member;

said brackets each including a locking member cooperable with said one or more notches and movable between engaged and disengaged positions for locking and unlocking said brackets at a position along said certain of said slats;

said pair of brackets each including spring means for urging said locking member into said engaged position;

a plate member disposed at a lower end of each said locking member for engaging and disengaging said one or more notches as said locking members are moved between said engaged and disengaged positions;

cable means operatively associated with at least one of said locking members for urging said one locking member into and out of said engaged and disengaged positions;

said cable means including a cable member extending through said pair of brackets and said restraining bar;

a lever member pivotally secured to each of said brackets and also to opposite ends of said cable member;

actuating means positioned on at least one of said brackets and operatively associated with said cable member and said lever members for causing said lever members to move said locking members of each of said pair of brackets generally simultaneously to releasably secure and allow longitudinal adjustment of said restraining bar and said brackets at predetermined positions along said certain of said slats;

said actuating means being manually moved generally linearly within a plane extending through said restraining bar.

10. An article carrier as set forth in claim 9 wherein said actuating means comprises an actuating member having a protrusion extending inwardly relative to an outer surface thereof to move at least one said lever member and said locking members between said engaged and disengaged positions.

11. An article carrier as set forth in claim 10 wherein said actuating member includes a camming surface defining said engaged and disengaged positions, said camming surface cooperating with at least one said locking member to move said at least one said locking member between said engaged and disengaged positions.

* * * * *